(12) United States Patent
Isogai et al.

(10) Patent No.: US 7,691,777 B2
(45) Date of Patent: Apr. 6, 2010

(54) OXIDATION CATALYST FOR PURIFYING EXHAUST GAS

(75) Inventors: Yuji Isogai, Wako (JP); Kiyoshi Tanaami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 11/907,916

(22) Filed: Oct. 18, 2007

(65) Prior Publication Data
US 2008/0095687 A1    Apr. 24, 2008

(30) Foreign Application Priority Data
Oct. 20, 2006    (JP)    ............... 2006-285712

(51) Int. Cl.
*B01J 23/32*    (2006.01)
*C01F 17/00*    (2006.01)
(52) U.S. Cl. ............... 502/324; 423/263; 502/344; 502/350; 502/353; 502/354; 502/355
(58) Field of Classification Search ............... 502/324, 502/325, 330, 332, 344, 347–351, 353–355
See application file for complete search history.

(56) References Cited

U.S. PATENT DOCUMENTS

| 5,882,616 | A | 3/1999 | Ziebarth et al. |
| 2004/0191133 | A1* | 9/2004 | Yamaguchi ............... 422/180 |
| 2004/0204315 | A1* | 10/2004 | Krumpelt et al. ............ 502/303 |
| 2005/0245391 | A1 | 11/2005 | Tanaka et al. |
| 2006/0081922 | A1* | 4/2006 | Golden ............... 257/335 |

FOREIGN PATENT DOCUMENTS

| DE | 42 17 339 A1 | 12/1993 |
| EP | 1 820 570 A1 | 8/2007 |
| EP | 1 842 588 A1 | 10/2007 |
| JP | 7-116519 A | 5/1995 |
| JP | 2003-334443 A | 11/2003 |

* cited by examiner

*Primary Examiner*—Timothy C Vanoy
*Assistant Examiner*—Richard M Rump
(74) *Attorney, Agent, or Firm*—Birch, Stewart, Kolasch & Birch, LLP

(57) ABSTRACT

An oxidation catalyst for purifying an exhaust gas, which can provide an excellent catalyst activity at lower temperatures for particulates and high boiling point hydrocarbons in an exhaust gas of an internal combustion engine, is provided. The oxidation catalyst for purifying an exhaust gas is composed of a composite metal oxide represented by the general formula: $Y_{1-x}Ag_xMnO_3$, wherein $0.01 \leq x \leq 0.15$. The composite metal oxide is represented by the general formula: $Y_{1-x}Ag_xMn_{1-y}A_yO_3$, wherein A is one metal selected from the group consisting of Ti, Nb, Ta and Ru, and $0.005 \leq y \leq 0.2$.

9 Claims, 1 Drawing Sheet

OXIDATION CATALYST FOR PURIFYING EXHAUST GAS

BACKGROUND OF THE INVENTION

1. Field of the Invention

The present invention relates to an oxidation catalyst for purifying an exhaust gas, which oxidizes particulates and hydrocarbons contained in an exhaust gas of an internal combustion engine to purify the gas.

2. Description of the Related Art

Conventionally, for oxidizing particulates and hydrocarbons contained in an exhaust gas of an internal combustion engine to purify the gas, an oxidation catalyst composed of a perovskite-type composite metal oxide is known.

As a perovskite-type composite metal oxide used as the oxidation catalyst, for example, a composite metal oxide is known which is represented by the general formula: $AB_{1-x}C_xO_3$, wherein A is at least one metal selected from the group consisting of La, Sr, Ce, Ba and Ca; B is at least one metal selected from the group consisting of Co, Fe, Ni, Cr, Mn and Mg; and C is Pt or Pd (see Japanese Patent Laid-Open No. 7-116519).

Further, as a perovskite-type composite metal oxide used as the oxidation catalyst, for example, a composite metal oxide is known which is represented by the general formula: $Ce_xM_{1-x}ZrO_3$, wherein M is at least one metal selected from the group consisting of La, Sm, Nd, Gd, Sc and Y; and $0.1 \leq x \leq 20$ (Japanese Patent Laid-Open No. 2003-334443).

However, the conventional perovskite-type composite metal oxides have inconveniences of having a high oxidation temperature for particulates and high boiling point hydrocarbons, and moreover, not providing a sufficient catalyst activity therefor.

SUMMARY OF THE INVENTION

It is an object of the present invention to resolve such inconveniences and provide oxidation catalysts for purifying an exhaust gas which can provide an excellent catalyst activity at lower temperatures for particulates and high boiling point hydrocarbons in an exhaust gas of an internal combustion engine.

For achieving the object, the oxidation catalyst for purifying an exhaust gas according to the present invention is an oxidation catalyst to oxidize an inclusion in an exhaust gas of an internal combustion engine to purify the gas, comprising a composite metal oxide represented by the general formula: $Y_{1-x}Ag_xMnO_3$, wherein $0.01 \leq x \leq 0.15$.

The oxidation catalyst for purifying an exhaust gas according to the present invention is a composite metal oxide obtained by substituting Ag as a third metal for part of Y as a first metal of a composite metal oxide represented by $YMnO_3$. This substitution makes the crystal structure of $Y_{1-x}Ag_xMnO_3$ to be a mixed crystal of a hexagonal and a perovskite structures; and $Y_{1-x}Ag_xMnO_3$ has a higher catalyst activity than $YMnO_3$.

The oxidation catalyst for purifying an exhaust gas according to the present invention can oxidize inclusions such as particulates and high boiling point hydrocarbons contained in an exhaust gas of an internal combustion engine at a lower temperature than an oxidation catalyst composed of a compound represented by $YMnO_3$.

Herein, with x of less than 0.01, the oxidation catalyst has an insufficient effect of enhancing the catalyst activity. By contrast, with x exceeding 0.15, the mixed crystal is difficult to sustain.

In the oxidation catalyst for purifying an exhaust gas according to the present invention, preferably the composite metal oxide is represented by the general formula: $Y_{1-x}Ag_xMn_{1-y}A_yO_3$, wherein A is one metal selected from the group consisting of Ti, Nb, Ta and Ru and desirably $0.005 \leq y \leq 0.2$. The composite metal oxide is obtained by substituting A (Ti, Nb, Ta or Ru) as a fourth metal for part of Mn as a second metal in a composite metal oxide represented by the general formula: $Y_{1-x}Ag_xMnO_3$. This substitution allows $Y_{1-x}Ag_xMn_{1-y}A_yO_3$ to have a higher catalyst activity than $Y_{1-x}Ag_xMnO_3$.

The oxidation catalyst for purifying an exhaust gas according to the present invention can oxidize inclusions such as particulates and high boiling point hydrocarbons contained in an exhaust gas of an internal combustion engine at a lower temperature than an oxidation catalyst comprising a compound represented by the general formula: $Y_{1-x}Ag_xMnO_3$, and can further promote the oxidation.

Herein, with y of less than 0.005, the oxidation catalyst has an insufficient effect of enhancing the catalyst activity. By contrast, with y exceeding 0.2, the mixed crystal is difficult to sustain.

DETAILED DESCRIPTION OF THE PREFERRED EMBODIMENTS

Figure 1:
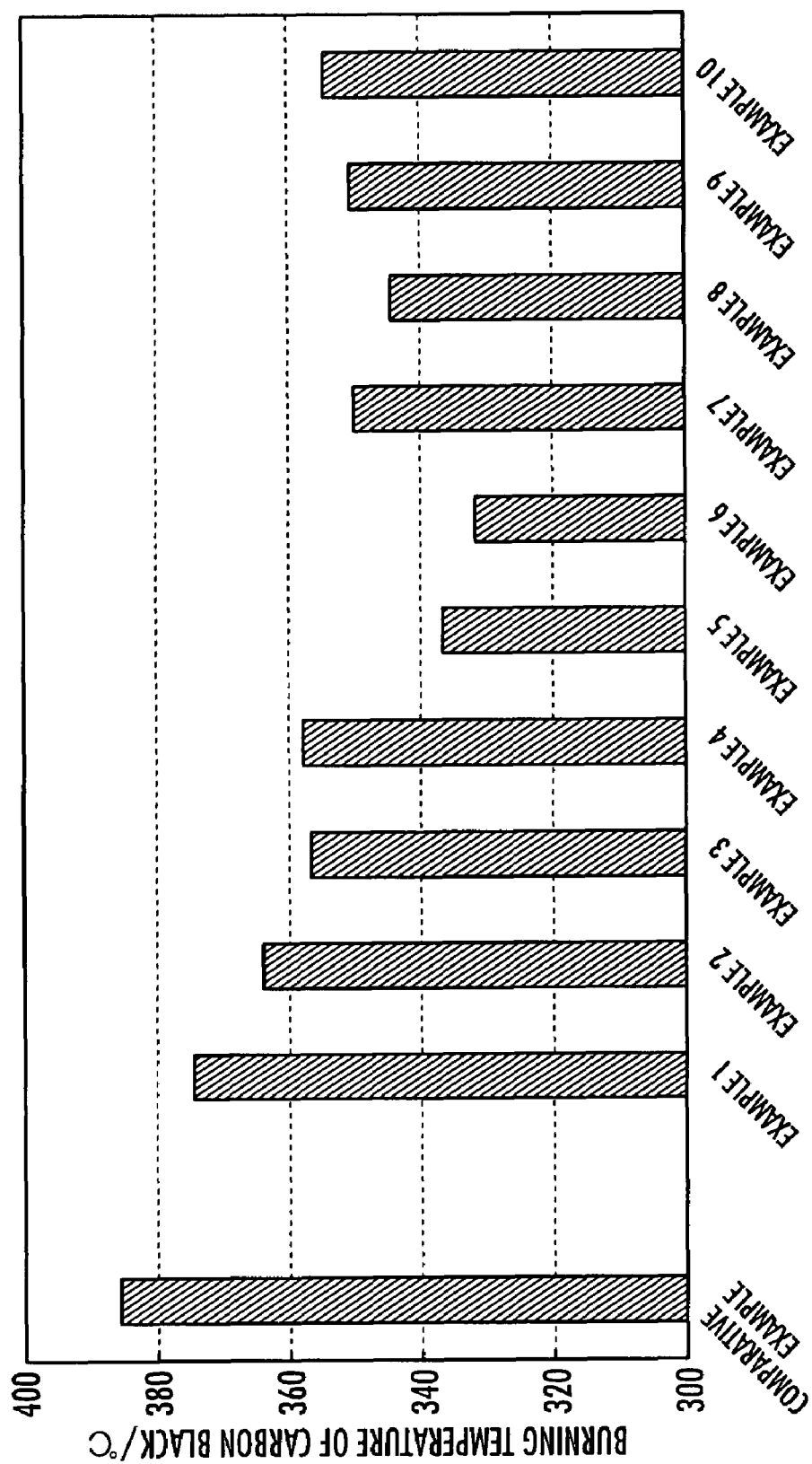
FIG. 1 is a graph showing effects of catalysts for purifying an exhaust gas according to the present invention.

Embodiments of the present invention will be further in detail described with reference to the accompanying drawing.

The catalyst for purifying an exhaust gas of a first embodiment comprises a composite metal oxide represented by the general formula: $Y_{1-x}Ag_xMnO_3$, wherein $0.01 \leq x \leq 0.15$. The composite metal oxide is obtained by substituting Ag as a third metal for part of Y as a first metal in the composite metal oxide represented by $YMnO_3$. This substitution causes phase transition of part of the hexagonal to a perovskite structure and the crystal structure of $Y_{1-x}Ag_xMnO_3$ is made to be a mixed crystal of hexagonal and perovskite structures. The substitution of monovalent Ag for trivalent Y changes part of Mn as a second metal from trivalent to tetravalent, which has a higher oxidation activity, to keep the electric neutrality in the crystal lattice. Further, generation of oxygen defects in the crystal lattice activates the substitution reaction of oxygen of the crystal lattice surface and oxygen in the air, whereby oxygen of the crystal lattice surface is easily dissociated. From above, $Y_{1-x}A_xMnO_3$ has a higher catalyst activity than $YMnO_3$.

Consequently, the catalyst for purifying an exhaust gas can oxidize inclusions such as particulates and high boiling point hydrocarbons contained in an exhaust gas of an internal combustion engine at a lower temperature than an oxidation catalyst composed of a compound represented by $YMnO_3$.

Herein, with x of less than 0.01, the effect of enhancing the catalyst activity is insufficient, since the effects of changing part of Mn to tetravalent and generating oxygen defects are insufficient. By contrast, with x exceeding 0.15, the mixed crystal is difficult to sustain.

Then, the catalyst for purifying an exhaust gas of a second embodiment comprises a composite metal oxide represented by the general formula: $Y_{1-x}A_xMn_{1-y}A_yO_3$, wherein A is one metal selected from the group consisting of Ti, Nb, Ta and Ru, and $0.005 \leq y \leq 0.2$. The composite metal oxide is obtained by substituting A (Ti, Nb, Ta or Ru) as a fourth metal for part of Mn as a second metal. The substitution of any one of tetravalent Ti, pentavalent Nb, pentavalent Ta and tetravalent Ru for trivalent Mn causes distortion in the crystal lattice and reduces the bonding energy of oxygen in the crystal lattice, whereby $Y_{1-x}A_xMn_{1-y}A_yO_3$ has a higher catalyst activity than $Y_{1-x}A_xMnO_3$.

Consequently, the oxidation catalyst for purifying an exhaust gas according to the present invention can oxidize inclusions such as particulates and high boiling point hydrocarbons contained in an exhaust gas of an internal combustion engine at a lower temperature than the oxidation catalyst composed of a compound represented by $Y_{1-x}A_xMnO_3$, and can further promote the oxidation.

Herein, the above-mentioned x and y are set such that the positive and negative charges of each constituting atom in the above-mentioned composite metal oxides are balanced. Herein, with y of less than 0.005, the effect of enhancing the catalyst activity is insufficient, since the effect of causing distortion of the crystal lattice is insufficient. By contrast, with y exceeding 0.2, the mixed crystal is difficult to sustain.

Then, examples and a comparative example of the present invention will be described.

EXAMPLE 1

In this example, first, yttrium nitrate, silver nitrate, manganese nitrate, malic acid and water in a molar ratio of 0.99:0.01:1:4:40 were mixed in a mortal at a temperature of 50° C. for 15 min, and then the mixture was subjected to a primary firing at a temperature of 350° C. for 1 hour. Next, the resultant material obtained by the primary firing was dry-crushed for 15 min, and was subjected to a secondary firing at a temperature of 900° C. for 1 hour to obtain a composite metal oxide powder represented by $Y_{0.99}Ag_{0.01}MnO_3$.

Then, the composite metal oxide powder obtained in this example was subjected to differential thermal analysis (DTA) as its activity evaluation. In the differential thermal analysis, 50 mg of the composite metal oxide powder obtained in this example as a catalyst for purifying an exhaust gas was mixed with 2.5 mg of a carbon black; the mixture was heated in an air flow atmosphere of 15 ml/min at a temperature rising rate of 10° C./min to measure a heat flow relative to temperatures; and the burning temperature of the carbon black was determined from an observed exothermic peak. The result is shown in FIG. 1.

EXAMPLE 2

In this example, a composite metal oxide represented by $Y_{0.95}Ag_{0.05}MnO_3$ was obtained as in Example 1, but with yttrium nitrate, silver nitrate, manganese nitrate, malic acid and water in a molar ratio of 0.95:0.05:1:4:40.

Then, the burning temperature of the carbon black was determined as in Example 1, but using the composite metal oxide obtained in this example as a catalyst for purifying an exhaust gas. The result is shown in FIG. 1.

EXAMPLE 3

In this example, a composite metal oxide represented by $Y_{0.9}Ag_{0.1}MnO_3$ was obtained as in Example 1, but with yttrium nitrate, silver nitrate, manganese nitrate, malic acid and water in a molar ratio of 0.9:0.1:1:4:40.

Then, the burning temperature of the carbon black was determined as in Example 1, but using the composite metal oxide obtained in this example as a catalyst for purifying an exhaust gas. The result is shown in FIG. 1.

EXAMPLE 4

In this example, a composite metal oxide represented by $Y_{0.85}Ag_{0.15}MnO_3$ was obtained as in Example 1, but with yttrium nitrate, silver nitrate, manganese nitrate, malic acid and water in a molar ratio of 0.85:0.15:1:4:40.

Then, the burning temperature of the carbon black was determined as in Example 1, but using the composite metal oxide obtained in this example as a catalyst for purifying an exhaust gas. The result is shown in FIG. 1.

EXAMPLE 5

In this example, first, yttrium nitrate, silver nitrate, manganese nitrate, ruthenium oxide, malic acid and water in a molar ratio of 0.95:0.05:0.95:0.05:4:40 were mixed in a planetary ball mill at 200 rpm for 10 min, and then the mixture was subjected to a primary firing at a temperature of 350° C. for 1 hour. Next, the resultant material obtained by the primary firing was dry-crushed for 15 min, and was subjected to a secondary firing at a temperature of 900° C. for 1 hour to obtain a composite metal oxide powder represented by $Y_{0.95}Ag_{0.05}Mn_{0.95}Ru_{0.05}O_3$.

Then, the burning temperature of the carbon black was determined as in Example 1, but using the composite metal oxide obtained in this example as a catalyst for purifying an exhaust gas. The result is shown in FIG. 1.

EXAMPLE 6

In this example, a composite metal oxide represented by $Y_{0.9}Ag_{0.1}Mn_{0.95}Ru_{0.05}O_3$ was obtained as in Example 5, but with yttrium nitrate, silver nitrate, manganese nitrate, ruthenium oxide, malic acid and water in a molar ratio of 0.9:0.1:0.95:0.05:4:40.

Then, the burning temperature of the carbon black was determined as in Example 1, but using the composite metal oxide obtained in this example as a catalyst for purifying an exhaust gas. The result is shown in FIG. 1.

EXAMPLE 7

In this example, a composite metal oxide represented by $Y_{0.85}Ag_{0.15}Mn_{0.95}Ru_{0.05}O_3$ was obtained as in Example 5, but with yttrium nitrate, silver nitrate, manganese nitrate, ruthenium oxide, malic acid and water in a molar ratio of 0.85:0.15:0.95:0.05:4:40.

Then, the burning temperature of the carbon black was determined as in Example 1, but using the composite metal oxide obtained in this example as a catalyst for purifying an exhaust gas. The result is shown in FIG. 1.

EXAMPLE 8

In this Example, a composite metal oxide represented by $Y_{0.09}Ag_{0.1}Mn_{0.95}Ti_{0.05}O_3$ was obtained as in Example 5, but using titanium oxide in place of ruthenium oxide.

Then, the burning temperature of the carbon black was determined as in Example 1, but using the composite metal oxide obtained in this example as a catalyst for purifying an exhaust gas. The result is shown in FIG. 1.

EXAMPLE 9

In this example, a composite metal oxide represented by $Y_{0.9}Ag_{0.1}Mn_{0.95}Nb_{0.05}O_3$ was obtained as in Example 5, but with yttrium nitrate, silver nitrate, manganese nitrate, niobium oxide ($Nb_2O_5$), malic acid and water in a molar ratio of 0.9:0.1:0.95:0.025:4:40.

Then, the burning temperature of the carbon black was determined as in Example 1, but using the composite metal oxide obtained in this example as a catalyst for purifying an exhaust gas. The result is shown in FIG. 1.

EXAMPLE 10

In this Example, a composite metal oxide represented by $Y_{0.9}Ag_{0.1}Mn_{0.95}Ta_{0.05}O_3$ was obtained as in Example 9, but using tantalum oxide in place of niobium oxide.

Then, the burning temperature of the carbon black was determined as in Example 1, but using the composite metal oxide obtained in this example as a catalyst for purifying an exhaust gas. The result is shown in FIG. 1.

COMPARATIVE EXAMPLE 1

In this comparative example, a composite metal oxide represented by $YMnO_3$ was obtained as in Example 1, but without using silver nitrate at all and with yttrium nitrate, manganese nitrate, malic acid and water in a molar ratio of 1:1:4:40.

Then, the burning temperature of the carbon black was determined as in Example 1, but using the composite metal oxide obtained in this comparative example as a catalyst for purifying an exhaust gas. The result is shown in FIG. 1.

As is clear from FIG. 1, the catalysts for purifying an exhaust gas of Examples 1 to 4 can oxidize (burn) the carbon black at a lower temperature than the catalyst for purifying an exhaust gas of Comparative Example 1 composed of a composite metal oxide represented by $YMnO_3$.

As is also clear from FIG. 1, the catalysts for purifying an exhaust gas of Examples 5 to 10 can oxidize (burn) the carbon black at a further lower temperature than Examples 1 to 4 composed of the composite metal oxides represented by $Y_{1-x}Ag_xMnO_3$, and can further provide the effect of promoting the oxidation.

What is claimed is:

1. An oxidation catalyst for an exhaust gas which oxidizes and purifies an inclusion in the exhaust gas of an internal combustion engine to purify the gas, the oxidation catalyst comprising a composite metal oxide represented by the general formula: $Y_{1-x}Ag_xMnO_3$, wherein $0.01 \leq x \leq 0.15$,
    wherein the oxidation catalyst which oxidizes and purifies the inclusion in the exhaust gas of the internal combustion engine is a crystal structure of the composite metal oxide formed of a mixed crystal of a hexagonal structure and a perovskite structure.

2. The oxidation catalyst for purifying an exhaust gas according to claim 1, wherein the composite metal oxide is represented by the general formula:
    $Y_{1-x}Ag_xMn_{1-y}A_yO_3$, wherein A is one metal selected from the group consisting of Ti, Nb, and Ta; and $0.005 \leq y \leq 0.2$.

3. The oxidation catalyst for purifying an exhaust gas according to claim 2, wherein the composite metal oxide has a y value of y=0.05.

4. The oxidation catalyst for purifying an exhaust gas according to claim 1, wherein the composite metal oxide is represented by the general formula:
    $Y_{1-x}Ag_xMn_{1-y}A_yO_3$, wherein A is one metal selected from the group consisting of Ti and Nb; and $0.005 \leq y \leq 0.2$.

5. An oxidation catalyst for an exhaust gas which oxidizes and purifies an inclusion in the exhaust gas of an internal combustion engine to purify the gas, the oxidation catalyst comprising a composite metal oxide represented by the general formula:
    $Y_{1-x}Ag_xMnO_3$, wherein $0.01 \leq x \leq 0.15$,
    wherein a crystal structure of the composite metal oxide is a mixed crystal of a hexagonal structure and a perovskite structure, and
    wherein the composite metal oxide is represented by the general formula: $Y_{1-x}Ag_xMn_{1-y}A_yO_3$, wherein A is one metal selected from the group consisting of Ti, Nb, and Ta; and $0.005 \leq y \leq 0.2$.

6. An oxidation catalyst for an exhaust gas which oxidizes and purifies an inclusion in the exhaust gas of an internal combustion engine to purify the gas, the oxidation catalyst comprising a composite metal oxide represented by the general formula:
    $Y_{1-x}Ag_xMnO_3$, wherein $0.01 \leq x \leq 0.15$,
    wherein the oxidation catalyst for an exhaust gas which oxidizes and purifies the inclusion in the exhaust gas of the internal combustion engine is a crystal structure of the composite metal oxide formed of a mixed crystal of a hexagonal structure and a perovskite structure, wherein the oxidation catalyst oxides the inclusion in the exhaust gas at a temperature less than 380° C., the inclusion being carbon black.

7. The oxidation catalyst for purifying an exhaust gas according to claim 6, wherein the composite metal oxide is represented by the general formula:
    $Y_{1-x}Ag_xMn_{1-y}A_yO_3$, wherein A is one metal selected from the group consisting of Ti, Nb, and Ta; and $0.005 \leq y \leq 0.2$.

8. The oxidation catalyst for purifying an exhaust gas according to claim 6, wherein the oxidation catalyst oxides the inclusion in the exhaust gas at a temperature less than 360° C., the inclusion being carbon black.

9. The oxidation catalyst for purifying an exhaust gas according to claim 6, wherein the oxidation catalyst oxides the inclusion in the exhaust gas at a temperature less than 340° C., the inclusion being carbon black.

* * * * *